Nov. 12, 1968 R. G. VOGELSANG 3,411,013

MARINE ACCESSORY DRIVE

Filed April 4, 1966

INVENTOR.
ROGER G. VOGELSANG

United States Patent Office 3,411,013
Patented Nov. 12, 1968

3,411,013
MARINE ACCESSORY DRIVE
Roger G. Vogelsang, Box 283,
Ada, Mich. 49301
Filed Apr. 4, 1966, Ser. No. 539,936
9 Claims. (Cl. 290—4)

This invention relates to a means of coupling a marine drive source to a propeller and driving an auxiliary electrical power generator by the hydraulic action on said propeller with the motion from water passage as occurs when sailing.

The object of this invention is to decouple the driving or motive power source of a sail boat to permit free-wheeling of its propeller while simultaneously utilizing a portion of this free-wheeling rotary power for generation of electrical power.

Of primary importance for racing sail craft is least drag, whether this be accomplished by a locked propeller or a free-wheeling one. The present invention permits instant selection of the desired mode by providing a means of declutching and reclutching with a synchro-mesh type gear thereby greatly increasing the ease of doing same whether input or output shafts are in motion.

Also of importance, is the recovery of electrical energy on board sailing craft when on extended cruises. The present invention allows this to be done constantly while under motion by sail by coupling the free-wheeling propeller through a gear train to an electrical generator. As this generator may be equipped similar to standard automotive battery charging apparatus to permit full battery charging, the invention likewise permits the marine craft batteries to maintain full charge by utilization of like voltage regulation. Of importance to sail craft operators is available power to operate electronic navigational equipments while on extended cruises by sail power alone.

A tachometer generator may also be provided and employed for monitoring relative shaft speeds, and may be coupled to totalizing logs for relative distance travelled. Said tachometer generator would require a resistive calibration network to give accurate relative speed readings where a positive or negative propeller slippage is prevalent, such as from the "driven" to a free-wheeling relative condition. This compensation network would be switched by the engagement lever that couples the input shaft to the output shaft.

Further, a cam type clutch is preferably incorporated in the drive train to the generator to permit prompt reversal of the drive shaft by the engine as needed. This said cam clutch thus permits the high inertia of the generator rotor and associated rotating elements to decelerate alone, while reversing rotary action as needed may be applied promptly to the propeller.

It may be seen that the generation of electrical power will be accomplished either by the motive power of the engine when driving the coupled propeller, or by the water passage external of the vessel's hull when underway, provided declutching from said engine is provided when engine is still.

In the accompanying drawings, a typical preferred arrangement is reflected. Of the drawings.

Figure 1:
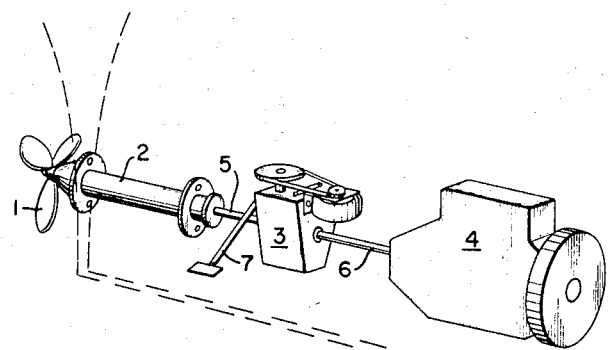
FIGURE 1 shows a typical power train arrangement from engine to propeller with the invention's basic components.

In FIGURE 1, propeller 1 is directly coupled through shaft 5 to an accessory drive 3 and permits mounting of said drive 3 on said shaft 5. As shaft log 2 has radial load bearings at each end, said drive may thus be mounted on shaft 5 with the stuffing box seal on the inner side for service.

Engine shaft 6, by a flexible coupling, to permit engine vibration, couples engine 4 to the input side of the accessory drive 3. Tie rod arm 7 prevents the housing of drive 3 and the elements mounted thereto from turning on the concentric drive shafts 5 and 6. Said tie rod arm 7 is affixed to a convenient adjacent area of the ship's hull.

Figure 2:
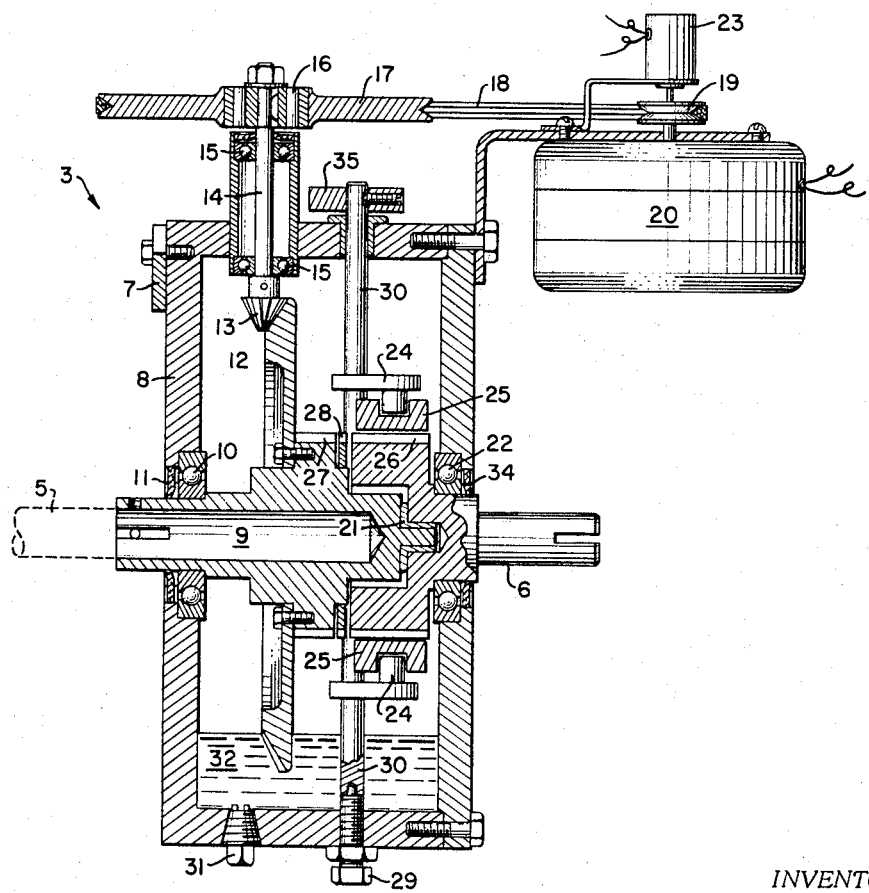
FIGURE 2 shows a cross section of the preferred gear box with associated relative components.

In FIGURE 2, the housing of the accessory drive 8 contains a hollow output shaft 9 on bearing 10 and oil seal 11. Said shaft 9 turns bevel gear 12, which in turn engages pinion 13 on shaft 14. Said shaft 14 turns in bearings 15, and through cam clutch 16 drives belt pulley 17, which in turn drives coupling belt 18 thence pulley 19 of which is affixed to generator 20 and tachometer generator 23.

Output bore or shaft 9 turns in bearing 21 which is concentric with input shaft 6 and permits axial thrust from output shaft 9 as given by propeller shaft 5, to be transmitted through shaft 6 and thence into engine 4. As this thrust in effect is the forward driving force of the engine acting through the propeller, it may be seen that when said propeller is acting as the driver during free-wheeling operations, said thrust bearing 21 is unloaded. Bearing 10 takes that reversed axial thrust load and permits this loading to be transmitted through the accessory drive case to bearing 22 thence to its input shaft 6 and to engine 4 which is affixed to the craft.

Axial drive from input to output through the accessory drive 3 is obtained when lever arm 35 is turned to rotate shaft 30 and actuate a pair of shifting forks 24 as attached to the latter. Rotation of the forks 24 will slide female spline 25 into engagement singly or jointly with male splines 26 and 27, the first being integral with input shaft 6 and the later of which is integral with output shaft 9 and bevel gear 12. Synchro gear 28 permits ease of coupling when either input or output shaft is rotating relative to the other by temporarily braking the other to permit spline engagement. Pivot screw 29 permits axial adjustment of shift lever shaft 30.

As illustrated, the housing 8 contains a quantity of gear lubricant 32 which prevents wear of gears and bearings. A magnetic drain plug 31 permits oil drainage with refilling permitted by another convenient top-side plug. Oil seals 11 and 34 prevent lubricant leakage from around input and output shafts 6 and 9.

Cam clutch 16 is integrally coupled to belt sheave 17 and permits over-ride of output rotary elements of the generator. As belt sheave 17 to the generator sheave 19 is a speed increaser, as is gear 12 to pinion 13, said generator rotates approximately ten (10) times faster than the propeller shaft 5 or input shaft 6 when coupled thereto, but may vary in overall ratio for specific propeller requirements. Generally, the maximum engine rated output speed will dictate the overall speed ratio to the generator thereby not permitting a detrimental affect to said generator by overrunning same.

Of the foregoing disclosure, other combinations of elements may be obvious to those skilled in the art, so to obtain all the benefits hereby described, I claim:

1. An accessory drive system for sailing craft and the like, comprising in combination: a propeller element rotatably mountable upon such a craft; an internal combustion engine for providing power to drive said propeller; means interconnecting said propeller and engine for coupling said power source to said propeller and also for uncoupling said propeller from said engine; said propeller when uncoupled and drawn through the water by the movement of said craft while under sail and being substantially freely rotatable; and generating means coupled to said propeller element to be driven thereby, for generating electrical power as a result of the rotation of the uncoupled propeller.

2. The drive system defined in claim 1, wherein said generating means is coupled to said propeller element through a cam-type clutch, said clutch operating such that rotary parts associated with the generating means may decelerate normally even though rotation of said propeller be quickly reversed by sudden coupling of the propeller to the engine.

3. The drive system defined in claim 1, wherein said generating means is coupled to said propeller element through speed-multiplying means, to raise the operating speed of the generating means to a desired predetermined level.

4. The drive system as defined in claim 3, wherein said generator is further coupled to said propeller element through a cam-type clutch, said clutch operating such that rotary parts associated with the generating means may decelerate normally even though the rotation of said propeller be quickly reversed by sudden coupling of the propeller to the said engine.

5. The drive system defined in claim 1, wherein said means interconnecting said propeller and said engine includes a synchro-mesh device for facilitating the coupling and uncoupling of the propeller element under conditions of relative motion between it and said engine.

6. The drive system defined in claim 1, wherein said means interconnecting said propeller and said engine comprises a gear box power train having aligned input and output shafts.

7. The drive system defined in claim 6, wherein said gear box includes a synchro-mesh device between said input and output shafts for facilitating the coupling and uncoupling of the propeller element under conditions of relative motion between it and said engine.

8. The drive system in claim 1, further including a tachometer means coupled to said propeller element, whereby the coupled rotation of the latter may be used to indicate distance travelled by the said craft.

9. The drive system in claim 1, further including a tachometer means coupled to said propeller element, whereby the coupled rotation of the latter may be used to indicate both rate and distance travelled by the said craft.

References Cited

UNITED STATES PATENTS

| | | | |
|---|---|---|---|
| 1,831,835 | 11/1931 | Allee | 290—54 |
| 1,898,973 | 2/1933 | Lansing | 290—54 |
| 3,238,911 | 3/1966 | Pazulski | 114—39 |

ORIS L. RADER, *Primary Examiner.*

G. SIMMONS, *Assistant Examiner.*